(12) United States Patent
Pflug et al.

(10) Patent No.: US 8,979,018 B2
(45) Date of Patent: Mar. 17, 2015

(54) SYSTEM AND METHOD FOR MINIMIZING WAVE DRAG THROUGH BILATERALLY ASYMMETRIC DESIGN

(71) Applicant: The Boeing Company, Chicago, IL (US)

(72) Inventors: William Pflug, Bellevue, WA (US); Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 169 days.

(21) Appl. No.: 13/687,483

(22) Filed: Nov. 28, 2012

(65) Prior Publication Data

US 2014/0145040 A1 May 29, 2014

(51) Int. Cl.
| | |
|---|---|
| *B64C 23/04* | (2006.01) |
| *B64C 3/10* | (2006.01) |
| *B64C 5/00* | (2006.01) |
| *B64C 30/00* | (2006.01) |
| *B64D 1/02* | (2006.01) |
| *B64D 7/00* | (2006.01) |
| *B64D 27/16* | (2006.01) |
| *B64D 29/00* | (2006.01) |
| *F42B 10/04* | (2006.01) |

(52) U.S. Cl.
CPC . *B64C 23/04* (2013.01); *B64C 5/00* (2013.01); *B64D 7/00* (2013.01); *B64D 1/02* (2013.01); *B64D 27/16* (2013.01); *B64D 29/00* (2013.01); *F42B 10/04* (2013.01); *B64C 3/10* (2013.01); *B64C 30/00* (2013.01)
USPC .......... 244/45 R; 244/55; 244/137.4

(58) Field of Classification Search
USPC .......................... 244/45 R, 46, 55
See application file for complete search history.

(56) References Cited

U.S. PATENT DOCUMENTS

| | | | | |
|---|---|---|---|---|
| 1,896,270 | A | * | 2/1933 | Wright ............................ 244/55 |
| 2,504,767 | A | | 4/1950 | Neville |
| 3,598,015 | A | | 8/1971 | Delistovich et al. |
| 3,624,833 | A | * | 11/1971 | Ricard ........................ 244/118.1 |
| 3,737,121 | A | * | 6/1973 | Jones ................................ 244/13 |
| 3,971,535 | A | * | 7/1976 | Jones ................................ 244/46 |
| 4,047,680 | A | | 9/1977 | Kaniut |
| 4,139,172 | A | | 2/1979 | Miller et al. |
| 4,256,276 | A | * | 3/1981 | Ciminera et al. .......... 244/118.1 |
| 4,289,287 | A | * | 9/1981 | Child et al. ................. 244/45 R |
| 4,836,470 | A | * | 6/1989 | Criswell ............................ 244/2 |
| 5,031,857 | A | * | 7/1991 | MacConochie et al. ..... 244/3.28 |
| 5,154,370 | A | * | 10/1992 | Cox et al. ...................... 244/3.27 |
| 6,923,404 | B1 | * | 8/2005 | Liu et al. .......................... 244/46 |
| 8,360,357 | B2 | * | 1/2013 | Cazals et al. .................... 244/46 |
| 8,408,490 | B2 | * | 4/2013 | McDonnell ................. 244/45 R |

(Continued)

OTHER PUBLICATIONS

"Thinking Obliquely : Robert T. Jones, the Oblique Wing, NASA's AD-1 Demonstrator, and its legacy" Larrimer, Bruce I., 2013, National Aeronautics and Space Administration, available at http://www.nasa.gov/sites/default/files/files/ThinkingObliquely-ebook.pdf.*

(Continued)

*Primary Examiner* — Joseph W Sanderson

(57) ABSTRACT

An air vehicle having a bilaterally asymmetric configuration for reducing wave drag may include a body having a longitudinal axis. The air vehicle may further include longitudinally offset engine nacelles, asymmetrically lengthened engine nacelles, and/or longitudinally offset protruding aerodynamic surfaces for reducing wave drag.

18 Claims, 10 Drawing Sheets

(56) References Cited

U.S. PATENT DOCUMENTS

| | | | |
|---|---|---|---|
| 2002/0189896 A1* | 12/2002 | Tse | 181/213 |
| 2005/0211827 A1* | 9/2005 | Barocela | 244/46 |
| 2007/0215751 A1* | 9/2007 | Robbins et al. | 244/55 |
| 2010/0148012 A1* | 6/2010 | McDonough et al. | 244/53 B |
| 2010/0243795 A1* | 9/2010 | McDonnell | 244/36 |
| 2011/0036941 A1* | 2/2011 | Cazals et al. | 244/46 |
| 2013/0221165 A1* | 8/2013 | McDonnell | 244/45 R |
| 2014/0145040 A1* | 5/2014 | Pflug et al. | 244/45 R |

OTHER PUBLICATIONS

Plumley, "Conceptual Assessment of an Oblique Flying Wing Aircraft," available at <http://www.dept.aoe.vt.edu/~mason/Mason_f/RWPAEThesis.pdf>, Virginia Tech, Blacksburg, Virginia, Feb. 22, 2008.

Khrabrov, "Non-Symmetrical General Aviation Aircraft and its Flight Control Law Design Using CEASIOM Software," AIAA-2010-284, 48th AIAA Aerospace Sciences Meeting Including the New Horizons Forum and Aerospace Exposition. Jan. 4-7, 2010, Orlando, Florida.

Military Videos, "Oblique Flying Wing", available at <http://www.strategypage.com/military_videos/military_photos_200782415033.aspx>, Sep. 10, 2012.

Nelson, "Some Examples of the Applications of the Transonic and Supersonic Area Rules to the Prediction of Wave Drag," NASA Technical Note D-446, Mar. 20, 1957.

Jones, "Theory of Wing-Body Drag at Supersonic Speeds," NACA Technical Report 1284, 1956.

Berard, "Method Development for Computer Aided Engineering for Aircraft Conceptual Design," KTH School of Engineering Sciences, p. 32, ISBN 978-91-7415-137-4, Stockholm, Sweden, Oct. 2008.

European Patent Office, Application No. 13191646.2, Extended European Search Report, dated Jul. 29, 2014.

* cited by examiner

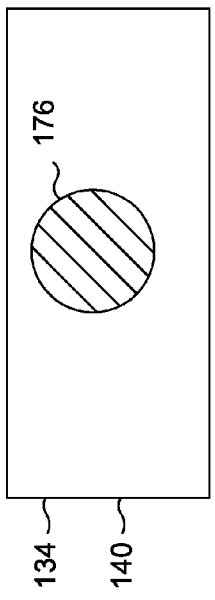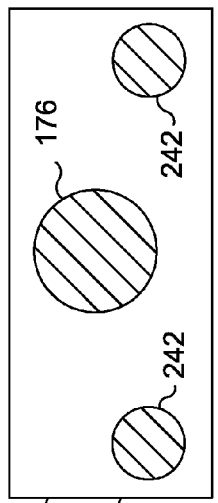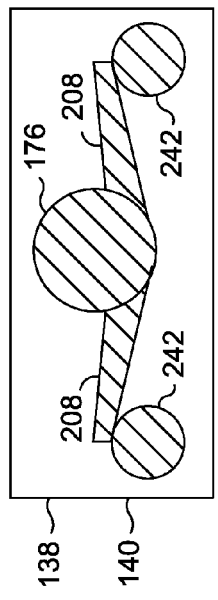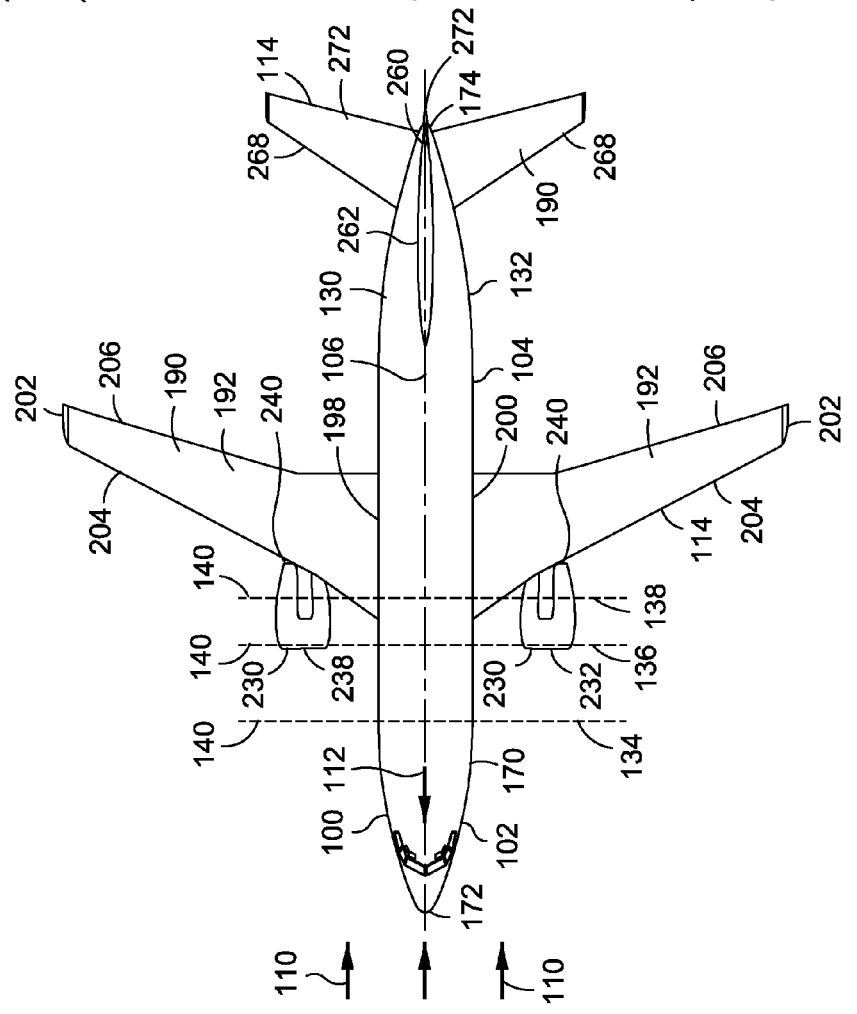

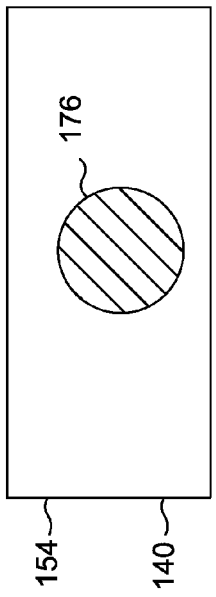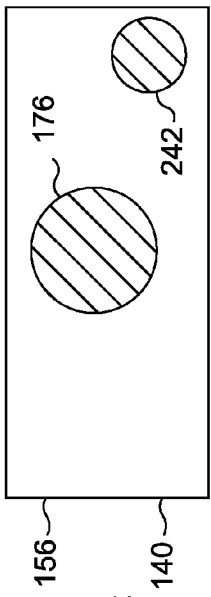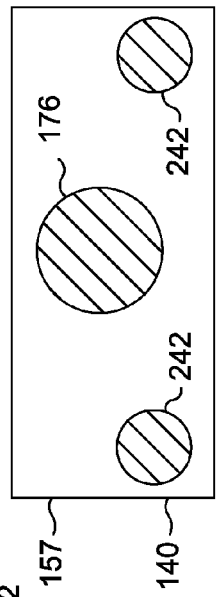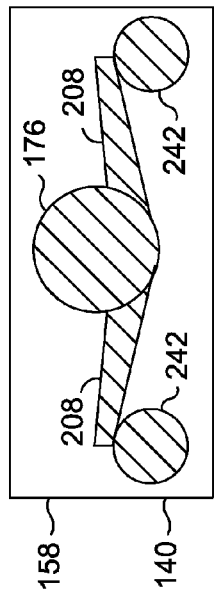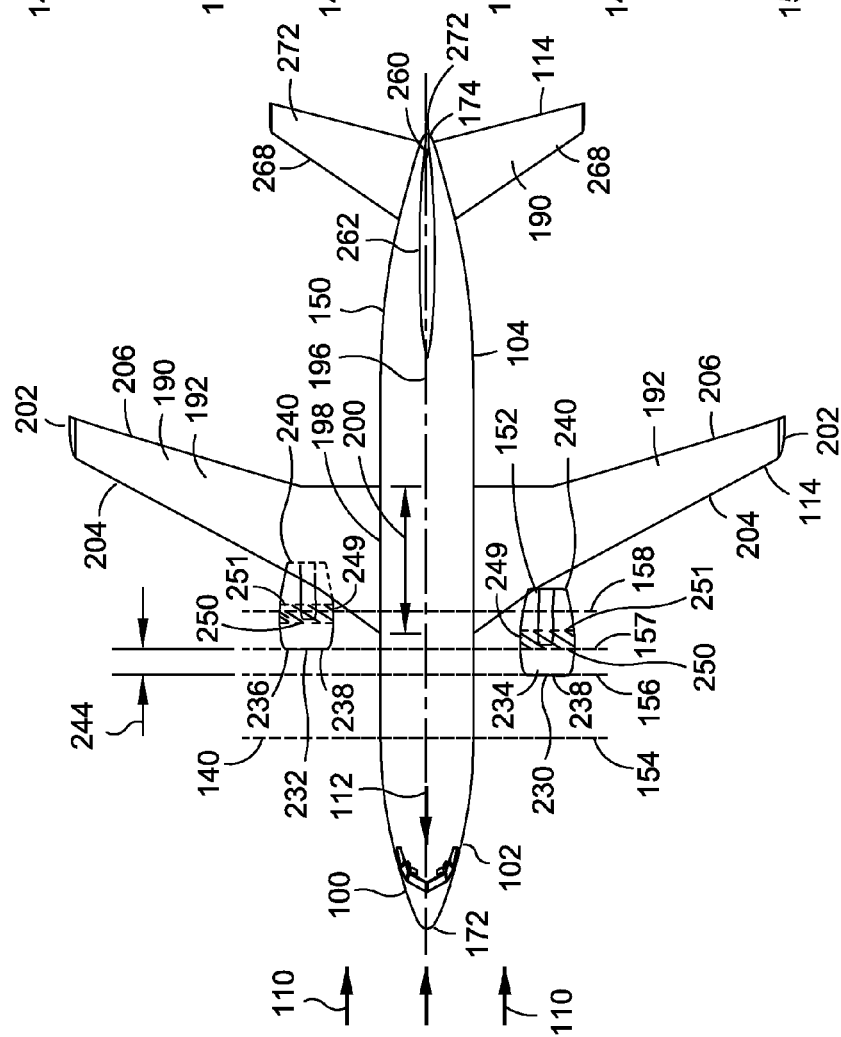

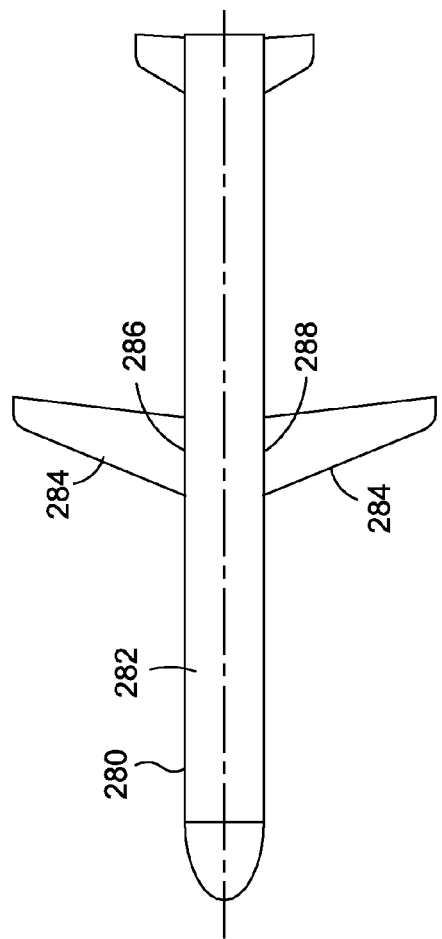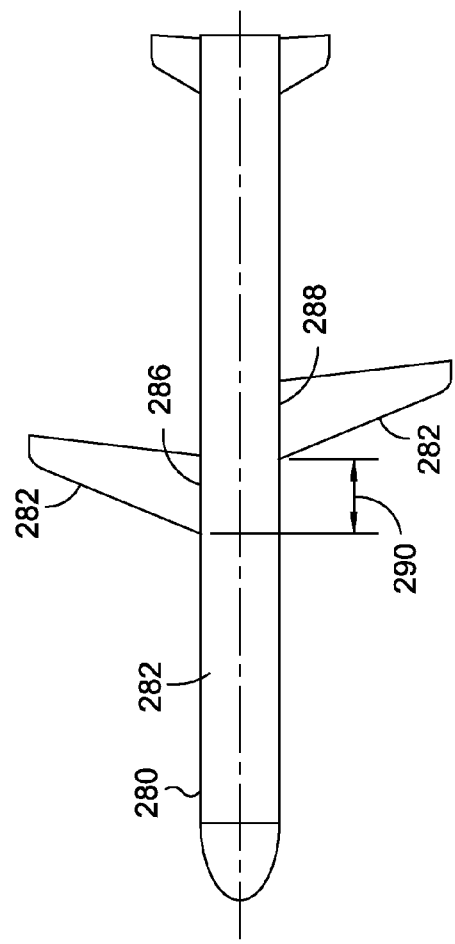

SYSTEM AND METHOD FOR MINIMIZING WAVE DRAG THROUGH BILATERALLY ASYMMETRIC DESIGN

FIELD

The present disclosure relates generally to aircraft configurations and, more particularly, to configurations for minimizing wave drag of an air vehicle.

BACKGROUND

Wave drag is a phenomenon that occurs as a result of the compression of air as an aircraft approaches the speed of sound. The compression generates a shock wave which may be accompanied by a localized change in the pressure and/or temperature of the air. At subsonic speeds, wave drag forms a relatively small portion of the overall aerodynamic drag on an aircraft. However, wave drag increases significantly as an aircraft approaches Mach 1.

Known methods of minimizing wave drag include designing an aircraft with a configuration that follows the Whitcomb Area Rule. The Whitcomb Area Rule dictates a minimization of change in the cross-sectional area of the aircraft in the longitudinal direction. In this regard, an aircraft following the Whitcomb Area Rule has a relatively smooth or gradual change in the size of the cross-sectional area regardless of changes in the cross-sectional shape. In conventional aircraft, the forward end of an aircraft fuselage may have a relatively small cross-sectional area. Unfortunately, the cross-sectional area may increase significantly and abruptly at the wings and/or engines and which may result in significant wave drag at transonic speeds.

Attempts to minimize changes in the longitudinal cross-sectional area of an aircraft including locally necking down the fuselage at the juncture with the wings to minimize the change in total cross-sectional area at that location. Unfortunately, designing and manufacturing an aircraft with a fuselage having a variable cross-sectional shape adds to the overall cost and complexity of the aircraft. In addition, in a commercial airliner, locally necking down the fuselage at the wings may be economically undesirable due the potential loss of revenue-generating passenger seats or cargo space.

Another approach to minimizing wave drag in an aircraft is by forming the wings in a swept arrangement. Wing sweep may minimize changes in the longitudinal cross-sectional area of an aircraft by distributing the cross-sectional area of the wings over a longer length of the fuselage. Wing sweep may delay the onset of wave drag rise by increasing the Mach number required to generate shockwaves on the wing surface. The increase in Mach number may occur due to alignment of the pressure isobars with the sweep of the wing such that shocks will only form when the component of velocity perpendicular to the pressure isobars reaches sonic speeds. Unfortunately, excessive wing sweep may have an effect on the low speed performance of an aircraft. In addition, wing sweep may add cost and complexity to the aircraft design and manufacturing process.

For aircraft operating at subsonic speeds, wave drag accounts for a relatively small portion of the total aerodynamic drag of the aircraft, as indicated above. However, a small reduction in wave drag may translate into a significant increase in fuel efficiency of the aircraft. Military aircraft that operate in the transonic region may also benefit from a reduction in wave drag with an increase in top speed and/or an increase in range.

As can be seen, there exists a need in the art for an aircraft configuration that minimizes wave drag and which may be provided with minimal impact on the aircraft design and manufacturing process.

SUMMARY

The above-noted needs associated with minimizing wave drag are specifically addressed and alleviated by the present disclosure which provides an air vehicle having a bilaterally asymmetric configuration. The air vehicle may include a body having a longitudinal axis. The air vehicle may further include longitudinally offset engine nacelles, asymmetrically lengthened engine nacelles, and/or longitudinally offset protruding aerodynamic surfaces including stabilizers, control surfaces, and/or high aspect ratio wings.

In a further embodiment, the air vehicle may comprise an aircraft having a bilaterally asymmetric configuration. The aircraft may include a fuselage and an engine nacelle mounted on each one of opposing sides of the fuselage. The engine nacelle on one side of the fuselage may have a forward nacelle extension. The engine nacelle on an opposite side of the fuselage may have an aft nacelle extension.

Also disclosed is a method of minimizing wave drag of an air vehicle. The method may include providing a body of an air vehicle having a longitudinal axis oriented generally parallel to a forward flight direction, and longitudinally offsetting at least one pair of components on opposite sides of the body relative to the longitudinal axis. The components may comprise engine nacelles, high aspect ratio wings, stabilizers, control surfaces, and/or external stores.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a top view of a baseline configuration of an aircraft having a bilaterally symmetric arrangement;

FIG. 1A is a diagrammatic section view of a local longitudinal cross-sectional area of the baseline configuration of the aircraft of FIG. 1 taken along a cutting plane at a forward station location of the aircraft;

FIG. 1B is a diagrammatic section view of a local longitudinal cross-sectional area of the baseline configuration taken along a cutting plane at an intermediate station location;

FIG. 1C is a diagrammatic section view of a local longitudinal cross-sectional area of the baseline configuration taken along a cutting plane at an aft station location;

FIG. 2 is a top view of an aircraft in a bilaterally asymmetric arrangement having an engine offset configuration;

FIG. 2A is a diagrammatic section view of a local longitudinal cross-sectional area of the engine offset configuration of the aircraft of FIG. 2 taken along a cutting plane at the forward station location;

FIG. 2B is a diagrammatic section view of a local longitudinal cross-sectional area of the engine offset configuration taken along a cutting plane at a first intermediate station location;

FIG. 2C is a diagrammatic section view of a local longitudinal cross-sectional area of the engine offset configuration taken along a cutting plane at a second intermediate station location;

FIG. 2D is a diagrammatic section view of a local longitudinal cross-sectional area of the engine offset configuration taken along a cutting plane at the aft station location;

FIG. 7A is a top view of an embodiment of a cruise missile in a bilaterally symmetric configuration;

FIG. 7B is a top view of the cruise missile of FIG. 7A in a bilaterally asymmetric configuration having offset missile wings;

DETAILED DESCRIPTION

Figure 3:
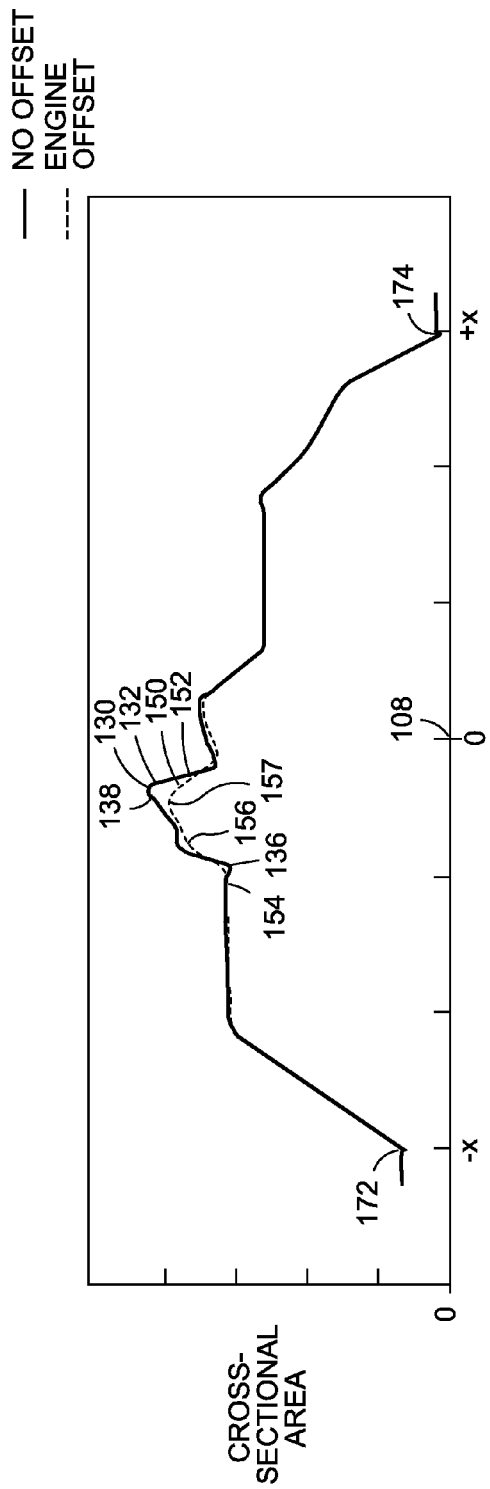
FIG. 3 is a graph plotting longitudinal cross-sectional area versus station location of a baseline aircraft configuration and an engine offset aircraft configuration.

Referring now to the drawings wherein the showings are for purposes of illustrating various embodiments of the present disclosure, shown in FIG. 1 is a top view of an air vehicle 100 configured as an aircraft 102 or airplane. The aircraft 102 is illustrated as a tube-and-wing aircraft 102 or airplane and is shown in a baseline configuration 132 wherein the aircraft components 114 are arranged in a bilaterally symmetric configuration 130 relative to a longitudinal axis 106 of the aircraft 102. The aircraft 102 may be arranged such that the longitudinal axis 106 of the body 104 is oriented generally parallel to a forward flight direction 112 of the aircraft 102 corresponding to a direction of an oncoming airflow stream 110.

The body 104 of the aircraft 102 may comprise a fuselage 170 extending from a fuselage forward end 172 to a fuselage aft end 174. The fuselage aft end 174 may include an empennage 260. The empennage 260 may include one or more tail surfaces such as one or more stabilizers 268 and/or control surfaces. For example, the empennage 260 may include horizontal stabilizers 268, one or more vertical stabilizers 262, and one or more control surfaces 272 such as an elevator (not shown) and/or a rudder (not shown) for directional control of the aircraft 102. In the baseline configuration 132 of the aircraft 102 in FIG. 1, the stabilizers 268 are arranged in a bilaterally symmetric configuration 130 wherein the horizontal stabilizers 268 are positioned at the same station location and are generally longitudinally aligned with one another.

In FIG. 1, the aircraft 102 may further include one or more protruding aerodynamic surfaces 190 that may extend outwardly from the body 104 or fuselage 170. For example, the aircraft 102 may include a pair of wings 192 that may be mounted on opposite sides of the fuselage 170. The wings 192 on each side of the fuselage 170 may be configured substantially similar to one another. For example, the wings 192 on each side of the fuselage 170 may generally have the same size, shape, contour, airfoil sections, wing span, taper ratio, sweep (e.g., forward or aft), and dihedral or anhedral. Although shown in an aftwardly swept and tapered configuration, the wings 192 may be provided in a non-swept configuration or a forwardly-swept configuration. In addition, the wings 192 may be provided in a non-tapered configured wherein the airfoil section (not shown) or chord is generally constant along a semi-span of each wing 192.

In embodiments of the system and method disclosed herein, the wings 192 may be provided as high aspect ratio wings 192. For example, the high aspect ratio wings 192 may have an aspect ratio of wingspan (not shown) to average chord (not shown) of at least 2. In an embodiment of a commercial airliner similar to that which is shown in FIGS. 1 and 2, the high aspect ratio wings 192 may be provided in an aspect ratio in the range of from approximately 2 to 10 or higher. Each wing 192 may have a wing root 198, a wing tip 202, a leading edge 204, and a trailing edge 206. The wing root 198 has a root chord 200 extending between the forward-most point on the leading edge 204 and the aft-most point on the trailing edge 206. In the present disclosure, the wing root 198 is defined at the intersection of the wing 192 with the fuselage 170. In the baseline configuration 132 of the aircraft 102 in FIG. 1, the wings 192 are arranged in a bilaterally symmetric configuration 130 wherein the wings 192 are positioned at the same station location.

In FIG. 1, the aircraft 102 may further include one or more propulsion units 230. The aircraft 102 is shown in a twin-engine arrangement having a pair of propulsion units 230 mounted to the wings 192 on opposite sides of the fuselage 170. The propulsion units 230 may be positioned at approximately the same lateral location on opposite sides of the fuselage 170. In an embodiment, the air vehicle 100 (i.e., aircraft 102) may include equivalent quantities of engine nacelles 232 or propulsion units 230 on opposing sides of the body 104. Each propulsion unit 230 of a pair may be positioned at the same lateral location on opposite sides of the fuselage 170. In this regard, each one of propulsion units 230 of a pair may be mounted at approximately the same distance from the fuselage 170 on opposite sides thereof. In an embodiment not shown, uneven quantities of propulsion units 230 or engine nacelles 232 may be included with the aircraft 102. In addition, propulsion units 230 may be mounted at any location on the wings 192, the fuselage 170, and/or on other structures (not shown) that may be included with the aircraft 102, such that the propulsion units 230 are not limited to mounting at the locations shown in FIG. 1. The propulsion units 230 on each side of the fuselage 170 may generally have a similar configuration although the system and method disclosed herein may be applied to aircraft 102 having different propulsion unit configurations.

In FIG. 1, each one of the propulsion units 230 may include engine nacelles 232 or propulsion units 230 which are shown as being wing-mounted as distinguished from engine nacelles (not shown) or propulsion units (not shown) that may be integrated with a fuselage (not shown). In any of the embodiments disclosed herein, engines nacelles may be fuselage-mounted (not shown) via pylons or mounts extending outwardly form the fuselage. In the embodiments disclosed herein, the engine nacelles 232 on each side of the fuselage 170 may have substantially similar nacelle diameters, lengths, and configurations.

Each engine nacelle 232 may generally define an outer geometry of the propulsion unit 230. In addition, each engine nacelle 232 has an engine inlet 238 which, in the present disclosure, is defined as the forward-most point and/or a front face of the engine nacelle 232. In the present disclosure, the engine nacelle 232 extends from the engine inlet to the engine nozzle 240 defined in the present disclosure as the aft-most point and/or an aft end of the engine nacelle 232 or the aft-most point of the propulsion unit 230. In the baseline configuration 132 of the aircraft 102 in FIG. 1, the wing-mounted engine nacelles 232 are arranged in a bilaterally symmetric configuration 130 wherein the engine inlets 238 and the engine nozzles 240 are generally positioned at the same station location.

Although the propulsion units 230 in the present disclosure are shown and described in the context of turbine engines having engine nacelles 232, the system and method disclosed herein may be applied to aircraft 102 having turboprop engines or other propeller-driven engines, and may additionally include piston engines, or any other type of the propulsion unit, without limitation. In addition, the system and method disclosed herein may be directed toward aircraft planforms other than the tube-and-wing aircraft 102 illustrated in FIG. 1. For example, the system and method disclosed herein may be directed toward blended wing aircraft or any type of air vehicle 100 or air/space vehicle, without limitation, that operates at, near, or above the transonic flight regime.

Referring to FIG. 1A, shown is a section view of a local longitudinal cross-sectional area 176 of the baseline configuration 132 of the aircraft 102 taken along a cutting plane 140 passing through the fuselage 170 at a forward station location 134 as shown in FIG. 1. The fuselage cross-sectional area 176 in FIG. 1A represents the aircraft cross-sectional area displacing an oncoming airflow stream 110 (FIG. 1).

Referring to FIG. 1B, shown is a section view of the local longitudinal cross-sectional area of the baseline configuration 132 aircraft 102 taken along a cutting plane 140 at an intermediate station location 136 (FIG. 1) of the aircraft 102. The cross-sectional area in FIG. 1B includes the cross-sectional area 176 of the fuselage 170 and the cross-sectional area 242 of both of the engine nacelles 232. In this regard, FIG. 1B illustrates the abrupt increase in the cross-sectional area displacing an oncoming airflow stream 110 (FIG. 1) for a conventional baseline configuration 132 aircraft 102.

Referring to FIG. 1C, shown is a section view of the local longitudinal cross-sectional area of the baseline configuration 132 aircraft 102 taken along a cutting plane 140 at an aft station location 138 (FIG. 1) of the aircraft 102. The cross-sectional area in FIG. 1C includes the cross-sectional area 176 of the fuselage 170, the cross-sectional area 242 of both of the engine nacelles 232, and the cross-sectional area 208 of the wing 192 on each side of the fuselage 170 at the aft station location 138. FIG. 1C further illustrates the abrupt increase in the cross-sectional area occurring in a relatively short distance between the intermediate station location 136 and the aft station location 138 (FIG. 1) and which may correspond to a significant increase in wave drag as the baseline configuration 132 aircraft 102 approaches the speed of sound.

Referring to FIG. 2, shown is a top view of an aircraft 102 advantageously having a bilaterally asymmetric configuration 150 having engine nacelles 232 that are longitudinally offset from one another. In FIG. 2, the engine nacelles 232 comprise a forward nacelle 234 which may be positioned forward of the aft nacelle 236 on the opposite side of the fuselage 170. In this regard, the engine nacelles 232 in FIG. 2 may be longitudinally offset from one another by an engine offset distance as described below. With the exception of the engine nacelles 232, the engine offset configuration 152 of the aircraft 102 in FIG. 2 may be substantially similar to the baseline configuration 132 of the aircraft 102 in FIG. 1 with regard to the bilateral symmetry of the remaining components 114 of the aircraft 102 with regard to the protruding aerodynamic surfaces 190 such as the wings 192, the horizontal stabilizers 268, and other components 114.

In FIG. 2, the engine nacelles 232 may be offset by a predetermined offset distance 244. In the embodiment shown, the forward nacelle 234 and the aft nacelle 236 are positioned at generally the same lateral location on opposite sides of the fuselage 170. However, the forward nacelle 234 may be positioned such that at least a portion of an approximately constant cross-sectional area 249 (i.e., illustrated in cross-hatch) of the forward nacelle 234 is generally longitudinally aligned with an engine inlet 238 (i.e., the forward face) of an aft nacelle 236. For example, a location of a forward end 250 of an approximately constant cross-sectional area 249 of the forward nacelle 234 is generally aligned with the engine inlet 238 of the aft nacelle 236 and which may provide an optimum offset distance 244 that corresponds to minimum wave drag for the aircraft configuration. In this regard, the forward nacelle 234 and the aft nacelle 236 may be longitudinally offset by an offset distance 244 that minimizes the rate of change (e.g., increasing or decreasing) of cross-sectional area of the aircraft relative to the rate of change of cross-sectional area of a bilaterally symmetric aircraft. In an embodiment, the forward nacelle 234 may be positioned forward of a non-offset location (not shown) or original symmetric location of the forward nacelle 234. Likewise, the aft nacelle 236 may be positioned aft of a non-offset location (not shown) or original symmetric location of the aft nacelle 236. However, the forward nacelle 234 and the aft nacelle 236 may be positioned at any location relative to their respective non-offset locations.

In an embodiment, the engine nacelles 232 may be offset by an offset distance 244 that is as large as is physically practical. For example, the engine nacelles 232 may be offset by any amount ranging from non-offset (i.e., longitudinally aligned) up to an offset distance 244 wherein the engine inlet 238 of one engine nacelle 232 is aligned with the engine nozzle 240 of the engine nacelle 232 on an opposite side of the fuselage 170. Larger engine offset distances 244 are also possible. In an embodiment, the engine nacelles 232 may be longitudinally offset such that at least a portion of an approximately constant cross-sectional area 249 of a forward nacelle 234 is generally longitudinally aligned with an engine inlet of an aft nacelle 236. The approximately constant cross-sectional area 249 is shown in cross-hatch in FIG. 2 and may include a region of maximum cross sectional area of the engine nacelle 232. In this regard, the approximately constant cross-sectional area 249 of an engine nacelle 232 may have a slightly curved outer surface (e.g., convexly curved) and is not necessarily limited to a constant outer diameter or constant cross-sectional shape.

In the embodiment shown in FIG. 2, the station location of the engine inlet 238 (e.g., the forward face) of the aft nacelle 236 on one side of the fuselage 170 may be generally longitudinally aligned with an aft end 251 of the approximately constant cross-sectional area 249 of the forward nacelle 234 on the opposite side of fuselage 170. In a further embodiment not shown, the station location of the aft end of 251 the approximately constant cross-sectional area 249 of the aft nacelle 236 may be generally longitudinally aligned with the engine nozzle 240 of the forward nacelle 234. In another embodiment not shown, the engine nozzle 240 of the forward nacelle 234 on one side of the fuselage 170 may be generally longitudinally aligned with the engine inlet 238 of the aft nacelle 236 on the opposite side of fuselage 170. Advantageously, the above-noted positions of the forward and aft end 250, 251 of the approximately constant cross-sectional area 249 may correspond to minimum wave drag of the aircraft 102.

In a further embodiment not shown, the engine nacelles 232 may be longitudinally offset such that a region of decreasing cross-sectional area of a forward nacelle 234 at least partially overlaps a region of increasing cross-sectional area of an aft nacelle 236. The region of decreasing cross-sectional area of an engine nacelle 232 may comprise the portion of the nacelle located aft of the approximately constant cross-sectional area 249. The region of increasing cross-sectional area of an engine nacelle 232 may comprise the portion of the nacelle located forward of the approximately constant cross-sectional area 249. By overlapping the decreasing cross-sectional of a nacelle on one side of the fuselage with the increasing cross-sectional area of a nacelle on an opposite side of the fuselage, the rate of change of cross-sectional area of the aircraft 102 may be minimized relative to an air vehicle having bilaterally symmetric (non-offset) engine nacelles.

For any one of the bilaterally asymmetric embodiments disclosed herein, the offset distance for a pair of components 114 (e.g., engine nacelles 232, wings 192, stabilizers 268, control surfaces 272, etc.) on opposite sides of the fuselage 170 may be analytically determined according to a method described below to calculate one or more offset distances that correspond to minimum wave drag for the aircraft 102. Alternatively, the amount of offset distance may be determined experimentally, or by a combination of analysis and experimentation.

The engine offset configuration 152 in FIG. 2 represents one of a variety of bilaterally asymmetric configurations 150 that may advantageously minimize an increase in wave drag of an aircraft 102. In the present disclosure, wave drag in an air vehicle 100 may advantageously be minimized by mounting one or more pairs of components 114 in an offset arrangement on opposite sides of the fuselage 170. For example, as described in greater detail below, wave drag may be minimized by longitudinally offsetting a pair of protruding aerodynamic surfaces 190 of the aircraft 102. Protruding aerodynamic surfaces 190 may be defined as any member that extends outwardly from the body 104 or fuselage 170 of the air vehicle 100 or aircraft 102.

In the present disclosure, protruding aerodynamic surfaces 190 may include high aspect ratio wings 192, horizontal stabilizers 268, vertical stabilizers 262, canted stabilizers (not shown), canards (not shown), control surfaces 272 and other protruding aerodynamic surfaces 190. Stabilizers may be defined as aerodynamic surfaces that provide directional stability to the aircraft 102 or air vehicle 100. In an embodiment, stabilizers may comprise fixed or non-movable protruding aerodynamic surfaces 190. In the present disclosure, protruding aerodynamic surfaces 190 may also comprise control surfaces 272 such as for aerodynamic control or directional control of aircraft 102 or air vehicle 100 and may include generally movable control surfaces 272. For example, a control surface 272 may include a rudder, an elevator, an elevon, a ruddervator, or any one of a variety of movable surfaces. The control surface 272 may be hingedly coupled at one edge to another member such as a stabilizer. However, a control surface 272 may be pivotably mounted to the air vehicle 100 or aircraft 102 as a separate component. For example, a control surface 272 may comprise an all-moving elevator, rudder, or other control surface configuration. In the present disclosure, a protruding aerodynamic surface 190 may include any member, structure, device, or component that presents a change in cross-sectional area to an oncoming airflow stream 110 passing over an air vehicle 100 or aircraft 102.

Referring to FIG. 2A, shown is a section view of the local longitudinal cross-sectional area of the engine offset configuration 152 of the aircraft 102 taken along the cutting plane 140 at the forward station location 154 in FIG. 2. The forward station location 154 in FIG. 2 is positioned at the same location as the forward station location 134 in FIG. 1. The cross-sectional area 176 in FIG. 2A has the same cross-sectional area 176 as in FIG. 1A.

Referring to FIG. 2B, shown is a section view of the local longitudinal cross-sectional area of the engine offset configuration 152 taken along a cutting plane 140 at a first intermediate station location 156 (FIG. 2) of the aircraft 102. The cross-sectional area in FIG. 2B includes the cross-sectional area 176 of the fuselage 170 and the cross-sectional area 242 of a single one of the engine nacelles 232. In this regard, FIG. 2B illustrates a more gradual increase in the cross-sectional area for the engine offset configuration 152 relative to the more abrupt increase in cross-sectional area shown in FIG. 1B for the baseline configuration 132.

Referring to FIG. 2C, shown is a section view of the local longitudinal cross-sectional area of the engine offset configuration 152 taken along a cutting plane 140 at a second intermediate station location 157 (FIG. 2). The cross-sectional area in FIG. 2C includes the cross-sectional area 176 of the fuselage 170 and the cross-sectional area 242 of both of the engine nacelles 232 and is similar in size to the cross-sectional area shown in FIG. 1B for the baseline configuration 132 aircraft 102 of FIG. 1. FIG. 2C further illustrates the gradual increase in cross-sectional area for the engine offset configuration 152 relative to the abrupt increase in cross-sectional area for the baseline configuration 132.

Referring to FIG. 2D, shown is a section view of the local longitudinal cross-sectional area of the baseline configuration 132 aircraft 102 taken along a cutting plane 140 at the aft station location 158 (FIG. 2) of the aircraft 102. The aft station location 158 in FIG. 2 is at the same location as the aft station location 138 in FIG. 1 and the cross-sectional area 176 in FIG. 2D has the same cross-sectional area 176 as in FIG. 1C. The cross-sectional area in FIG. 2D includes the cross-sectional area of the fuselage 170, the cross-sectional area 242 of both of the engine nacelles 232, and the cross-sectional area 208 of a portion of the wings 192 at the aft station location 158.

FIGS. 2A-2D illustrate the more gradual increase in cross-sectional area achieved by longitudinally offsetting the engine nacelles 232 relative to the abrupt increase in cross-sectional area of the baseline configuration 132 as shown in FIGS. 1A-1D. While not indicated in FIGS. 2A-2D, the offset engine nacelles 232 may be longitudinally offset to provide a gradual decrease in cross-sectional area as the airflow stream 110 approaches the aft end of the longitudinally offset engine nacelles 232. As may be appreciated, by longitudinally offsetting the engine nacelles 232, wave drag may be minimized due to the more gradual change in the distribution of the cross-sectional area along the longitudinal axis 106 of an aircraft 102. In any of the embodiments disclosed herein, the gradual change in the distribution of the cross-sectional area may include a gradual increase in cross-sectional area and/or a gradual decrease in cross-sectional area of the air vehicle 100 or aircraft 102.

Referring to FIG. 3, shown is a graph plotting longitudinal cross-sectional area versus station location for the baseline configuration 132 (i.e., no offset) of FIG. 1 and for the engine offset configuration 152 of FIG. 2. Station location is indicated relative to an origin 108 position which is located on the graph midway between the forward fuselage location on a left side of the graph and the aft fuselage location on a right side of the graph. The graph of FIG. 3 was generated from a relatively low fidelity analysis of the baseline configuration 132 and a relatively low fidelity analysis of the engine offset configuration 152 using the same analysis parameters as in the baseline configuration 132 analysis.

In FIG. 3, the plot of the area distribution for the baseline configuration 132 (i.e., no offset) is illustrated as a solid line. The plot of the area distribution for the engine offset configuration 152 is illustrated as a dashed line and is superimposed with the solid line of the baseline configuration 132. For the engine offset configuration 152, the dashed line of the plot illustrates an initial increase in cross-sectional area at the first intermediate station location 156 and represents the area contribution from the forward nacelle 234 (FIG. 2). As can be seen, the initial area increase for the engine offset configuration 152 occurs prior to (i.e., relative to an oncoming airflow stream) the initial increase in cross-sectional area for the baseline configuration 132. The difference in height of the dashed line and solid line also illustrates that the maximum cross-sectional area of the engine offset configuration 152 is less than the maximum cross-sectional area of the baseline configuration 132.

Figure 4:
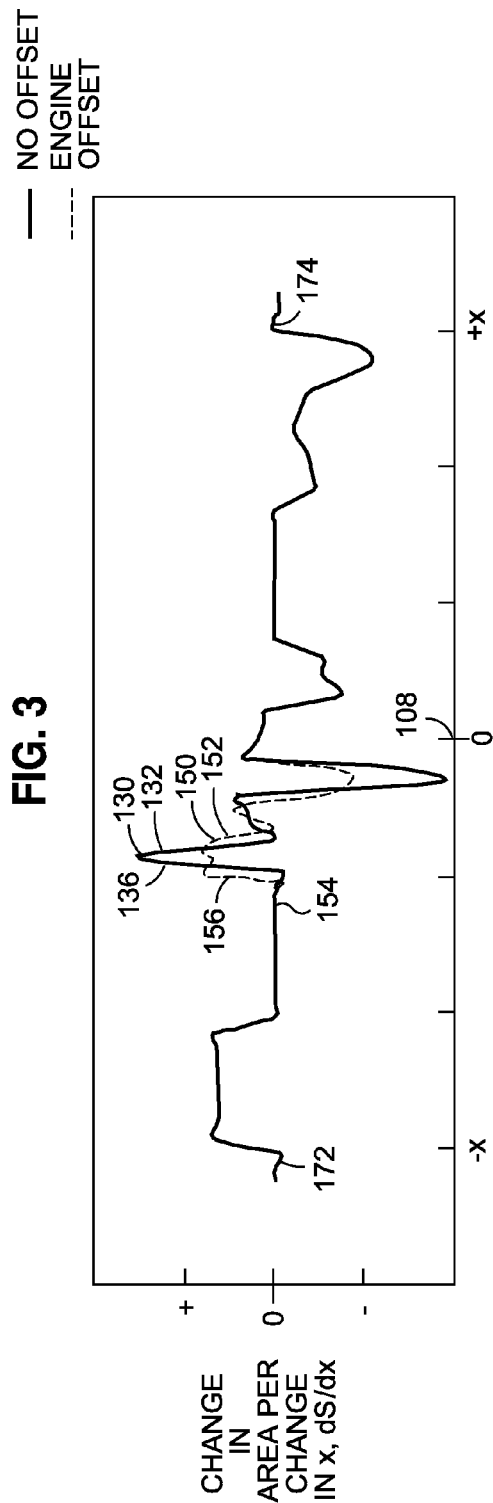
FIG. 4 is a graph plotting change in cross-sectional area versus station location for the cross-sectional area plots of the baseline configuration and the engine offset configuration of FIG. 3.

FIG. 4 illustrates a plot of the derivative of the area contribution of FIG. 3 and illustrates the change in cross-sectional area versus station location for the baseline configuration 132 and the engine offset configuration 152. The plot of change in area distribution for the baseline configuration 132 is shown as a solid line. The plot of change in area distribution for the engine offset configuration 152 is shown as a dashed line. The dashed line in FIG. 4 illustrates relatively uniform blending of the area contributions from the forward nacelle 234 (FIG. 2) and the aft nacelle 236 (FIG. 2) for the engine offset configuration 152 and which advantageously corresponds to a minimal rate of area increase. In contrast, in the same section of the plot of FIG. 4, the solid line illustrates an abrupt increase in area contribution (i.e., at element 130) from the longitudinally-aligned engine nacelles 232 of the baseline configuration 132 (FIG. 1). In addition, the negative peak in the solid line illustrates an abrupt decrease in area contribution from the longitudinally-aligned engine nacelles 232 of the baseline configuration 132.

Figure 5:
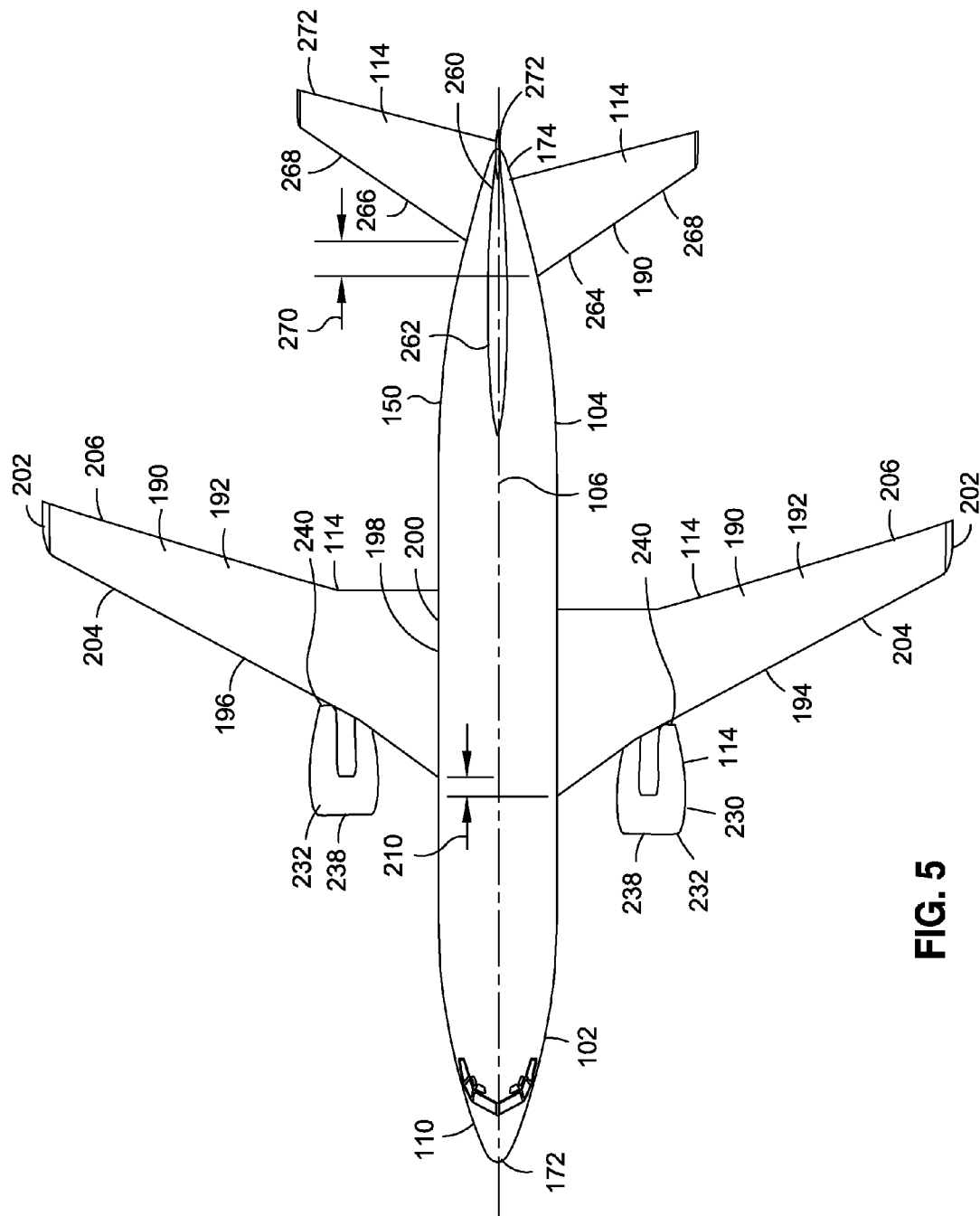
FIG. 5 is a top view of an embodiment of an aircraft in a bilaterally asymmetric configuration having offset wings and offset horizontal stabilizers.

FIG. 5 shows an aircraft 102 in a bilaterally asymmetric configuration 150 having longitudinally offset protruding aerodynamic surfaces 190 including longitudinally offset wings 192 and/or longitudinally offset horizontal stabilizers 268. In the present disclosure, as indicated above, a protruding aerodynamic surface 190 comprises any member that is mounted to and/or extends or protrudes outwardly from the body 104. The aircraft 102 in FIG. 5 includes a forward wing 194 and an aft wing 196 which may be offset from one another by any wing offset distance, without limitation. The aircraft 102 may also include stabilizers that may be offset from one another by any distance, without limitation. For example, an aircraft 102 may include a pair of horizontal stabilizers 268 such as a forward stabilizer 264 and an aft stabilizer 266 that may be offset from one another. Although not shown, the vertical stabilizer 262 or vertical tail may be longitudinally offset with respect to the horizontal stabilizer 268. In addition to offset wings 192, an aircraft 102 in a bilaterally asymmetric configuration 150 may include longitudinally offset canard surfaces (not shown) mounted at a forward end of a fuselage, longitudinally offset ruddervators (not shown) as may be mounted to an aft end of a fuselage, or other empennage configurations (e.g., V-tail, U-tail, T-tail, etc.—not shown) that may be offset from one another. Longitudinally offset protruding aerodynamic surfaces 190 may also include control surfaces (not shown) that may be mounted to a blended wing aircraft (not shown).

In FIG. 5, the forward wing 194 and the aft wing 196 may be longitudinally offset from one another by any distance, as indicated above. The engine nacelles 232 on each side of the fuselage may be mounted at the same position relative to the wing such that longitudinally offsetting the wings also results in longitudinally offsetting the engine nacelles. However, the aircraft may be configured with longitudinally offset wings and non-offset wing-mounted engine nacelles (not shown). In FIG. 5, the longitudinally offset wings 192 may have a generally high aspect ratio of up to 10 or greater as compared to a delta wing (not shown) aircraft that may have a relatively low aspect ratio of 3 or less.

In any of the offset configurations disclosed herein, a maximum offset distance of a set of components (engine nacelles 232, protruding aerodynamic surfaces 190, etc.) may be dependent on the configuration of the air vehicle. For example, the wing offset distance on an unmanned aerial vehicle (UAV) may be less than the wing offset distance on a commercial jetliner. The maximum offset distance may be determined by structural, aerodynamic, and/or manufacturing constraints, or other constraints. In FIG. 5, the forward wing 194 is shown offset from the aft wing 196 by a wing offset distance 210 of approximately a length of the root chord 200 of one of the wings 192. As indicated above, the wing root 198 may be defined at a location of an intersection of the wings 192 with the fuselage 170. In an embodiment, the wings 192 may be offset from one another by an offset distance 210 of between approximately 1 foot and a length of the root chord 200. However, in order to minimize complications due to load path transfers or torsional loads on the fuselage 170, or complications regarding aerodynamics, the offset distance 210 of a pair of offset wings 192 may be minimized.

The horizontal stabilizers 268 may also be longitudinally offset by a stabilizer offset distance 270 that may be limited to the length of the root chord 200 of one of the horizontal stabilizers 268. However, the horizontal stabilizers 268 may be offset by any stabilizer offset distance 270, without limitation, as indicated above. In any embodiment disclosed herein, the protruding aerodynamic surfaces 190 may be longitudinally offset from one another such that a region of decreasing cross-sectional area of a forward component (e.g. a forward protruding aerodynamic surface) on one side of the fuselage at least partially overlaps a region of increasing cross-sectional area of an aft component (e.g. an aft protruding aerodynamic surface) on an opposite side of the fuselage.

Figure 6:
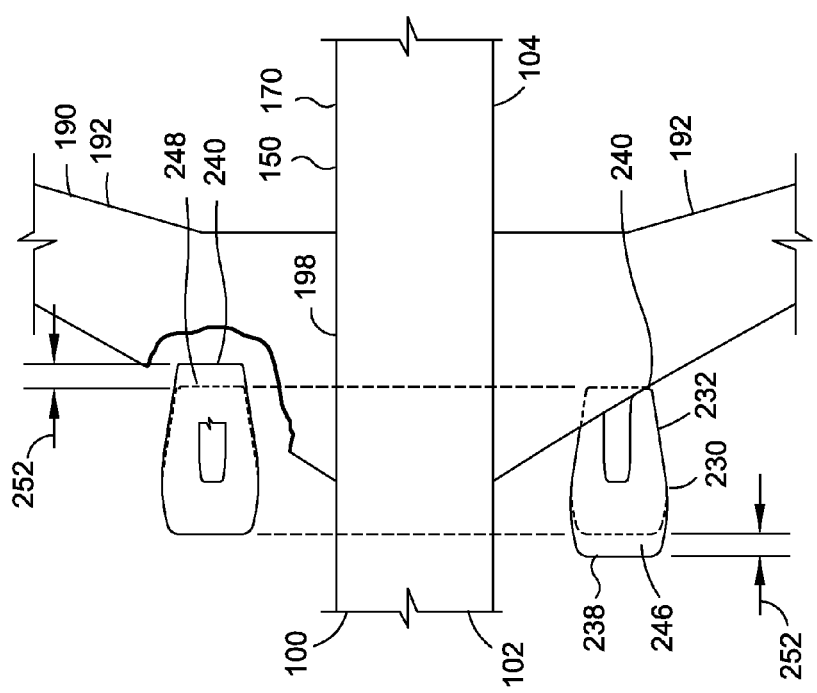
FIG. 6 is a top view of an embodiment of an aircraft in a bilaterally asymmetric configuration having forward and aft nacelle extensions mounted to the engine nacelles on opposite sides of the aircraft.

FIG. 6 shows a further embodiment of an aircraft 102 in a bilaterally asymmetric configuration 150. As shown, the wings 192 may be bilaterally symmetric such that the wings 192 are positioned at the same station location on opposite sides of the fuselage 170. Bilateral asymmetry of the aircraft 102 may be provided with asymmetrically lengthened engine nacelles 232. In this regard, an engine nacelle 232 on one side of the fuselage 170 may be provided with a forward nacelle extension 246. The forward nacelle extension 246 may extend or protrude forwardly from the engine nacelle 232. In addition, an engine nacelle 232 on an opposite side of the fuselage 170 may be provided with an aft nacelle extension 248. The aft nacelle extension 248 may extend or protrude aftwardly from the engine nacelle 232. An aircraft may include a forward nacelle extension 246 on one engine nacelle 232, and/or an aft nacelle extension 248 on one nacelle. However, an aircraft may be provided with both a forward nacelle extension 246 and an aft nacelle extension 248 on one engine nacelle 232.

As shown, the forward nacelle extension 246 may be offset by an extension offset distance 252 and/or the aft nacelle extension 248 may be offset by an extension offset distance 252 which may be different than the extension offset distance 252 of the forward nacelle extension 246. The embodiment shown in FIG. 6 may represent a retrofit configuration for an existing aircraft 102 having a bilaterally symmetric configuration, at least with regard to the symmetry of the wings 192 and engine nacelles 232. By adding a forward nacelle extension 246 and/or an aft nacelle extension 248, wave drag characteristics of an existing aircraft 102 may be significantly improved.

FIG. 7A shows an embodiment of a cruise missile 280 in a bilaterally symmetric configuration 130 having a missile body 282 and longitudinally-aligned missile wings 284. The cruise missile 280 represents an alternative embodiment of an air vehicle 100 that may operate in the transonic region and which may benefit from the system and method for minimizing wave drag as disclosed herein.

FIG. 7B shows the cruise missile 280 in a bilaterally asymmetric configuration 150 having offset missile wings 284. The missile wings 284 may be offset by a missile wing offset 290 distance of up to a length of the root chord 288 of the missile wing root 286 although the missile wings 286 may be provided in any missile wing offset 290 distance, without limitation, as indicated above. Advantageously, the offset missile wings 284 may provide a more gradual change in the distribution of the cross-sectional area of the missile 280 relative to the symmetric missile 280 configuration shown in FIG. 7A. The above-described offset configurations may also be applied to a rocket (not shown) or launch vehicle. For example, a rocket may be provided with stabilizing fins (not shown) that may be offset for minimizing the wave drag. Any one of the above-described offset configurations may also be applied to other vehicles including space vehicles for minimizing wave drag during travel through the atmosphere.

Figure 8A:
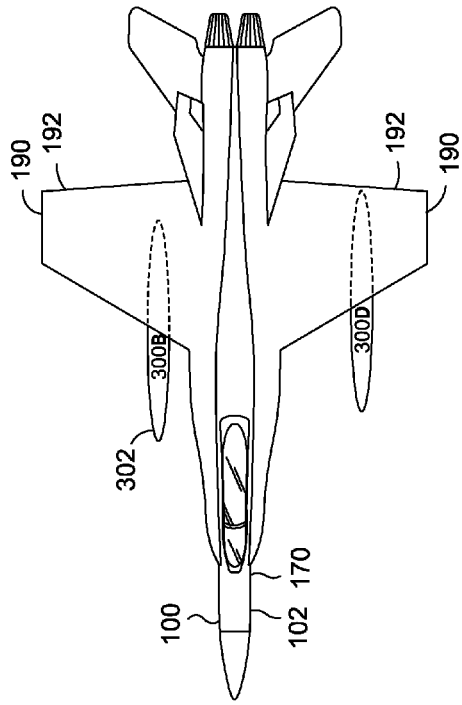
FIG. 8A is a top view of an embodiment of an aircraft having external stores mounted in a bilaterally symmetric configuration.

FIG. 8A is a top view of an embodiment of a military aircraft 102 configuration. The aircraft 102 has an equal number of external stores 300 indentified as 300A, 300B, 300C, and 300D mounted in a bilaterally symmetric configuration 130 on the aircraft 102. The external stores 300 are illustrated as fuel pods 302 mounted to the wings in two pairs on opposite sides of the fuselage 170. However, the external stores 300 may be provided in any type of store configuration that may be releasably mounted to the aircraft 102. For example, external stores 300 may include, but are not limited to, weapons such as missiles and/or bombs, surveillance pods, or any other type of external store that may be releasably mounted to the aircraft 102. The external stores 300 may be released from the aircraft 102 in a manner that minimizes asymmetrical loading while minimizing the rate of change of cross-sectional area of the aircraft 102 similar to the engine offset configuration 152 illustrated in FIG. 2 and described above.

Figure 8B:
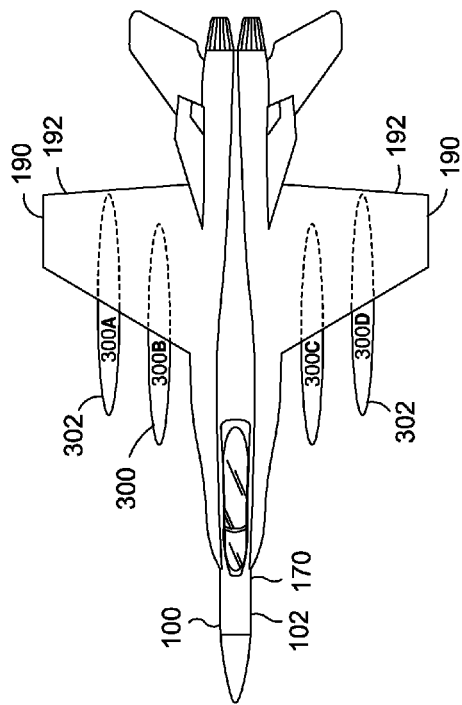
FIG. 8B is a top view of the aircraft of FIG. 8A wherein a first one of the external stores is released on one side of the fuselage and on an outboard side of the wing.
Figure 8C:
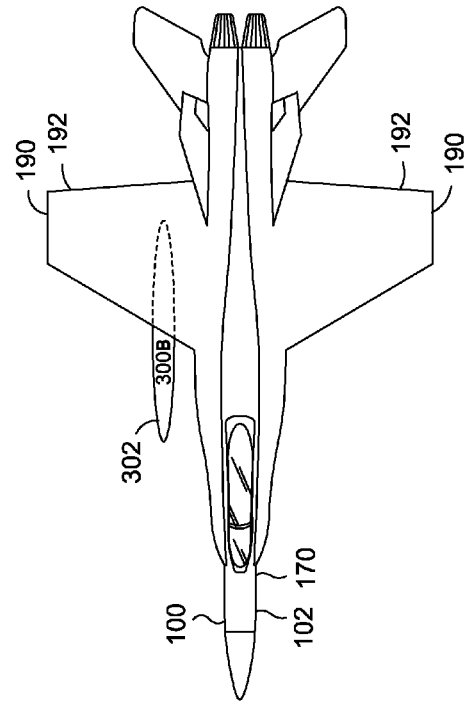
FIG. 8C is a top view of the aircraft of FIG. 8B wherein a second one of the external stores is released on an opposite side of the fuselage from FIG. 8B and on an inboard side of the wing.
Figure 8D:
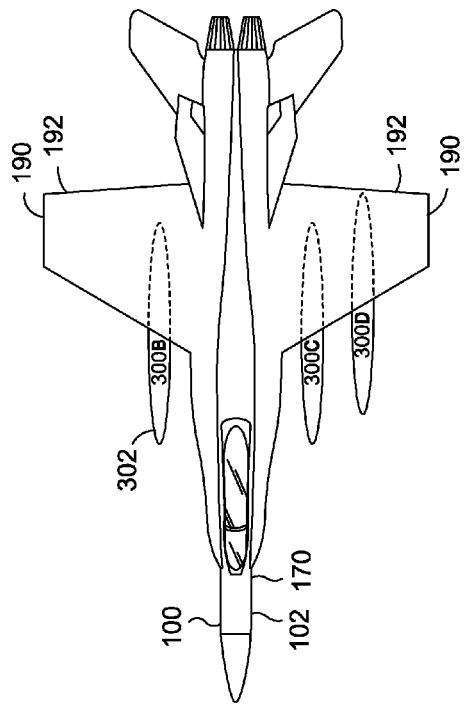
FIG. 8D is a top view of the aircraft of FIG. 8C wherein a third one of the external stores is released from the same side of the fuselage as in FIG. 8C.

For example, FIG. 8B-8D illustrates an embodiment of a sequence for releasing external stores 300 in a manner that minimizes cross-sectional area change. FIG. 8B shows the release of external store 300A prior to the release of the external stores 300B, 300C, and 300D to effectively provide a bilateral asymmetric configuration in FIG. 8B. FIG. 8C illustrates the next stage of the release sequence wherein external store 300C is released prior to the release of external stores 300B and 300D. The stage of the release sequence in FIG. 8C may represent an arrangement that minimizes the rate of change of the cross-sectional area of the aircraft 102 relative to an arrangement wherein external stores 300 are released in equal quantities (not shown) from each side of the aircraft 102.

FIG. 8D illustrates the next stage of the release sequence wherein external store 300D is released prior to external store 300B which, although not shown, is the last one of the external stores 300 to be released. The release sequence 300A-300C-300D-300B may provide a balance between aircraft stability and control concerns with reductions in wave drag. However, other release sequences are possible that may effectively decrease wave drag by minimizing the rate of change in the cross-sectional area of the aircraft 102. For example, for aircraft (not shown) having more than four (4) releasable external stores 300, alternative release sequences may be configured to minimize cross-sectional area change. By releasing the external stores 300 in one or more of the above-described manners, wave drag may be minimized which may improve range and/or increase air speed capability such as for operations near or in the transonic region.

Figure 8E:
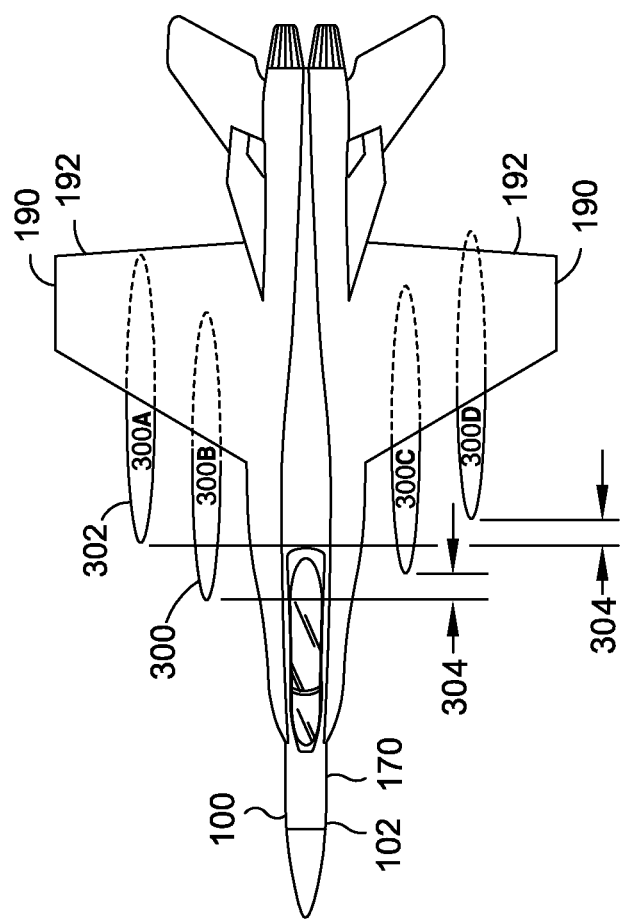
FIG. 8E is a top view of an embodiment of an aircraft having external stores mounted in a bilaterally asymmetric configuration.

FIG. 8E illustrates an embodiment of the aircraft of FIG. 8A wherein the external stores 300 are loaded or mounted to the aircraft 102 in a staggered manner that may minimize the rate of change in the cross-sectional area of the aircraft 102. In contrast to the arrangement shown in FIG. 8A wherein the external stores 300A, 300B, 300C, and 300D are mounted in a bilaterally symmetric arrangement, FIG. 8E illustrates the external stores mounted in a bilaterally offset or staggered arrangement. For example, in FIG. 8E, the external stores 300A and 300D may be offset from one another by a store offset 304. Likewise, external stores 300B and 300C may be offset from one another by a store offset 304. The offset of the external stores 300A-300D and 300B-300C may minimize the additions and subtractions of the cross-sectional area along the longitudinal axis of the aircraft 102 and which may advantageously minimize wave drag.

Figure 9:
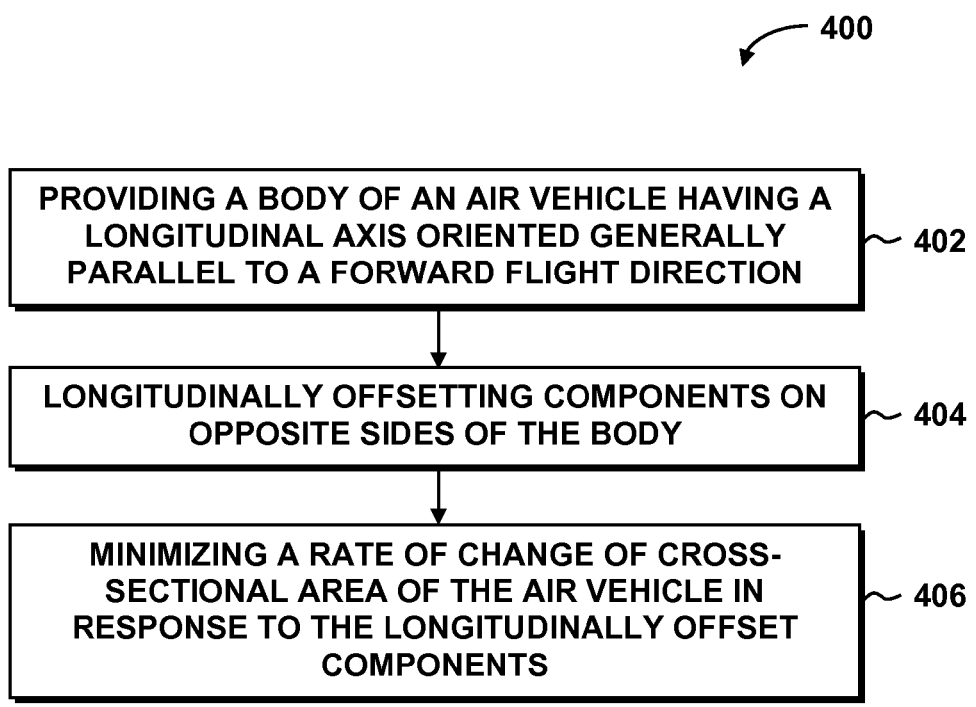
FIG. 9 is a flow diagram having one or more operation that may be included in a method of minimizing wave drag of an air vehicle.

FIG. 9 is a flow diagram illustrating an embodiment of a method 400 of minimizing wave drag of an air vehicle 100. The method may include Step 402 of providing a body 104 of an air vehicle 100 such as an aircraft 102. As indicated above, the air vehicle 100 has a longitudinal axis 106 oriented generally parallel to a forward flight direction 112. The aircraft 102 may comprise a commercial aircraft 102 as illustrated in FIG. 2, a military aircraft 102 as illustrated in FIG. 8B, a missile such as a cruise missile 280 illustrated in FIG. 7B, or any one of a variety of alternative air vehicle 100 configurations that may operate at or near the transonic region or at high mach numbers.

Step 404 of the method 400 of FIG. 9 may include longitudinally offsetting at least one pair of components 114 on opposite sides of the body 104. However, the present disclosure is not limited to offsetting even numbers (e.g., pairs) of components. In this regard, the system and method disclosed herein may include offsetting uneven numbers of components such as offsetting three (3) or more components relative to one another to minimize a rate of change in the cross-sectional area of an aircraft. As indicated above, components 114 that may be offset may include protruding aerodynamic surfaces 190 (FIG. 2) such as wings 192 (FIG. 2), horizontal stabilizers 268 (FIG. 2), vertical stabilizers 262 (FIG. 2), canted stabilizers (not shown), control surfaces 272 (FIG. 2), or any other protruding aerodynamic surfaces 190 extending outwardly from the fuselage 170 or body 104 of an air vehicle 100.

Components 114 may also include propulsion units 230 including engine nacelles 232 which may be wing-mounted and which may be longitudinally offset on opposite sides of the fuselage 170 as described above. In an embodiment, the method may comprise mounting a pair of wings 192 in a bilaterally symmetrical manner (i.e., non-offset) on opposite sides of the body 104, and longitudinally offsetting a pair of engine nacelles 232 as shown in FIG. 2 and/or in one of the embodiments described above. Although not shown, the method may include overlapping a region of decreasing cross-sectional area of a forward nacelle with a region of increasing cross-sectional area of an aft nacelle as described above.

In an embodiment, an existing bilaterally symmetric air vehicle 100 may be converted to a bilaterally asymmetric air vehicle 100 by adding extensions to one or more components 114 of the air vehicle 100 to achieve an offset arrangement. For example, bilateral asymmetry may be achieved by retrofitting an existing aircraft 102 or airplane to add a forward nacelle extension 246 to an engine nacelle 232 on one side of the fuselage 170, and/or add an aft nacelle extension 248 to an engine nacelle 232 on an opposite side of the fuselage 170 as shown in FIG. 6. The forward nacelle extension 246 and/or the aft nacelle extension 248 may be offset by an extension offset distance 252 as mentioned above. As may be appreciated, other extension configurations may be added to other components 114 of an existing aircraft 102 to achieve bilateral asymmetry and improve the cross-sectional area distribution along a longitudinal axis 106 of the aircraft 102.

Bilateral asymmetry may also be achieved in a bilaterally symmetric air vehicle 100 (e.g., the aircraft of FIG. 8A) by the manner in which external stores 300 are released from the aircraft. For example, as indicated above with regard to FIGS. 8A-8D, bilateral asymmetry may be effectively provided by releasing external stores 300 in a sequence that minimizes the change in the cross-sectional area of the aircraft (FIG. 8B) and which may preferably minimize total configuration drag of the aircraft. Total configuration drag may include parasite drag (including interference drag), pressure drag, and wave drag. Referring to FIG. 8E, bilateral asymmetry may also be provided by mounting external stores 300 with store offsets 304 as described above as a means to minimize changes in the cross-sectional area of the aircraft 102 which may minimize wave drag.

Step 406 of the method 400 of FIG. 9 includes minimizing a rate of change in the cross-sectional area of the air vehicle or aircraft in response to longitudinally offsetting the components. The longitudinal offsetting of the components results in a bilaterally asymmetric configuration. In any of the embodiments disclosed herein, bilateral asymmetry may be implemented in a manner that minimizes total configuration drag. Minimizing total configuration drag may include a reduction in wave drag relative to the wave drag of a bilaterally symmetric configuration. However, minimizing total configuration drag may result in a reduced wave drag that may not be reduced to an absolute minimum.

The method of minimizing wave drag may include estimating the wave drag of an air vehicle 100 as a means to determine an optimal offset distance between a pair of components 114 mounted on opposite sides of the body 104 of the air vehicle 100. In this regard, the minimum wave drag corresponds to at least one nominal offset between the components 114. The wave drag of an air vehicle 100 may be represented by the drag coefficient ($C_D$) of the air vehicle 100 at a given Mach number. The wave drag coefficient of an air vehicle 100 may be estimated by calculating the cross-sectional area distribution S(x) of the air vehicle 100 over a vehicle length $l_v$ as illustrated in FIG. 3. Based on the area distribution, the method may include calculating the rate of change of the cross-sectional area distribution S'(x) over the vehicle length $l_v$. The graph of FIG. 4 plots the rate of change of cross-sectional area distribution S'(x) over the vehicle length $l_v$. As shown in FIG. 3, the area distribution S(x) may be centered with reference to an origin 108 located midway between the forward and aft ends of the air vehicle 100. The area distribution S(x) may be converted to a function of φ wherein:

$$x = \frac{l_v}{2}\cos\phi$$

The method may then include calculating a Fourier series expansion of the cross-sectional area distribution S(x) using the following equation:

$$S'(\phi) \cong \sum_{n=1}^{n_{max}} b_n \sin(n\phi)$$

$$\text{wherein: } b_n = \frac{2}{\pi}\int_0^\pi S'(\phi)\sin(n\phi)\,d\phi$$

The wave drag may be estimated using the following relation for the wave drag coefficient $C_D$:

$$C_D = \frac{\pi}{4S}\sum_{n=1}^{n_{max}} n b_n^2$$

wherein $n_{max}$ represents a quantity of Fourier terms that results in convergence of the Fourier series. The above described method of estimating wave drag is disclosed in NASA Technical Note D-446 (1960) entitled "Some Examples of the Applications of the Transonic and Supersonic Area Rules to the Prediction of Wave Drag" by R. Nelson et al., and in NACA Technical Report 1284 (1956) entitled "Theory of Wing-Body Drag at Supersonic Speeds" by R. Jones.

The method may further include iteratively adjusting the offset distance and estimating the resulting wave drag coefficient such as by using the above-described method until at least one offset distance is determined where the wave drag is minimized for a given aircraft 102 configuration. In this regard, aircraft 102 components 114 such as the engine nacelles 232 may be offset within a range of offset distances that may yield two or more locations where wave drag is minimized, as indicated by the local minima 216 in the graph of FIG. 10.

Figure 10:
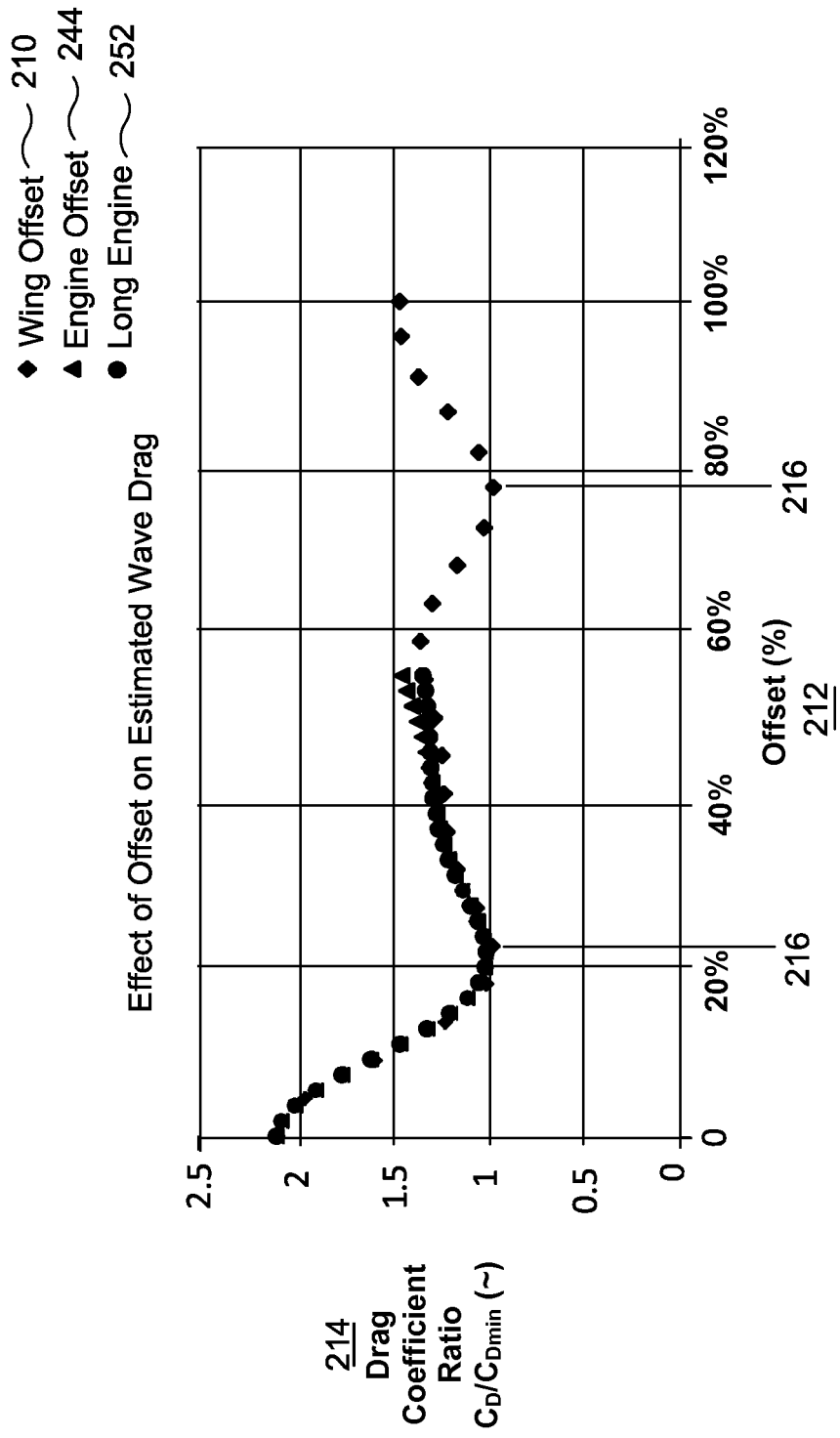
FIG. 10 is a graph plotting a ratio of wave drag coefficient/minimum drag versus offset distance as a percentage of a maximum offset distance for a bilaterally asymmetric configuration of an aircraft having offset wings, offset engines, and offset engine nacelle lengths.

FIG. 10 is a graph plotting a drag coefficient ratio 214 of wave drag coefficient/minimum drag versus offset distance 212 as a percentage of a maximum offset distance for several bilaterally asymmetric configurations 150 of an aircraft 102. The drag coefficient for each one of the configurations was calculated using a quantity of Fourier terms of $n_{max}$=200. The configurations include offset wings 210, offset engines 244, and offset nacelle extensions 252 wherein the drag coefficient ratio 214 for each configuration is plotted as a function of offset distance 212 as a percentage of maximum offset. For each one of the aircraft 102 configurations, FIG. 10 illustrates local minima 216 for at least two offset distances 212. Although FIG. 10 only plots the drag coefficient ratio 214 for the entire length of the maximum offset for the offset wings 210, the plots for the offset engines 244 and offset nacelle extensions 252 are similar to the offset wings 210 and may have local minima at similar locations as the offset wings 210.

In FIG. 10, each one of the minima 216 represents an offset distance 212 (e.g., percentage) that minimizes the rate increase in cross-sectional area distribution. For example, for the engine offset configuration 152, a local minima 216 of the drag coefficient ratio 214 occurs at an offset distance 212 of approximately 20 percent of a maximum offset and which corresponds to the offset arrangement illustrated in FIG. 2. FIG. 10 also illustrates a local minima 216 of the drag coefficient ratio 214 at an offset distance 212 of approximately 78 percent and which corresponds to an engine offset embodiment (not shown) wherein a region of decreasing cross-sectional area of a forward nacelle 234 (FIG. 2) overlaps a region of increasing cross-sectional area of an aft nacelle 236 (FIG. 2) on the opposite side of the fuselage 170.

FIG. 10 further illustrates that for a generally bilaterally symmetric aircraft 102, adding a forward nacelle extension 246 and/or an aft nacelle extension 248 may provide a cost-effective manner for achieving bilateral asymmetry and reducing wave drag. In this regard, an existing aircraft 102 configuration may be retrofitted without significant alteration of the structural loading of the aircraft 102. Advantageously, nacelle extensions represent a means for modifying an existing aircraft 102 to fly at higher speeds with relatively minor redesign. In this regard, the various embodiments disclosed herein provide a means for adjusting the longitudinal location of the components 114 (e.g., wings, engines, stabilizers, control surfaces, etc.) of an aircraft 102 to improve the existing cross-sectional area distribution without changing the local diameter of the fuselage, and without the use of airfoils that are tailored for the transonic flight regime.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. An air vehicle having a bilaterally asymmetric configuration, comprising:
    a body having aftwardly-swept fixed wines, the body having a longitudinal axis continuously oriented parallel to a forward flight direction when the air vehicle is in flight; and
    at least one of the following components being mounted on opposite sides of the body:
        longitudinally offset wing-mounted engine nacelles;
        asymmetrically lengthened engine nacelles; and
        longitudinally offset protruding aerodynamic surfaces comprising at least one of stabilizers, canards, empennage control surfaces, and high aspect ratio wings.

2. The air vehicle of claim 1, wherein:
    an engine inlet of a forward nacelle is aft of the engine inlet of an aft nacelle and forward of a nozzle of the aft nacelle; and
    the forward nacelle and the aft nacelle being either the longitudinally offset engine nacelles or the asymmetrically lengthened engine nacelles.

3. The air vehicle of claim 2, wherein:
    a location approximately midway between the engine inlet and the nozzle of the forward nacelle is longitudinally aligned with the engine inlet of the aft nacelle.

4. The air vehicle of claim 1, wherein:
    a region of decreasing cross-sectional area of a forward nacelle overlaps a region of increasing cross-sectional area of an aft nacelle; and
    the forward nacelle and the aft nacelle being either the longitudinally offset engine nacelles or the asymmetrically lengthened engine nacelles.

5. The air vehicle of claim 1, wherein the asymmetrically lengthened engine nacelles comprise at least one of:
    a forward nacelle extension mounted to an engine nacelle on one side of the body; and
    an aft nacelle extension mounted to an engine nacelle on an opposite side of the body.

6. The air vehicle of claim 1, wherein:
    the air vehicle comprises an airplane.

7. The air vehicle of claim 1, wherein:
    the air vehicle comprises at least one of a missile, a rocket, and a space vehicle.

8. An aircraft having a bilaterally asymmetric configuration, comprising:
    a fuselage having fixed wines;
    an engine nacelle positioned on each one of opposite sides of the fuselage;
        the engine nacelle on one side of the fuselage having a fixed forward nacelle extension; and
        the engine nacelle on the opposite side of the fuselage having a fixed aft nacelle extension.

9. A method of minimizing wave drag of an air vehicle, comprising the steps of:
    providing a body of an air vehicle having aftwardly-swept fixed wines, the body having a longitudinal axis continuously oriented parallel to a forward flight direction when the air vehicle is in flight; and
    longitudinally offsetting at least one of the following components on opposite sides of the body:
        wing-mounted engine nacelles; and
        at least one of external stores, and high aspect ratio wings.

10. The method of claim 9, wherein the step of longitudinally offsetting the engine nacelles comprises:
    locating an engine inlet of a forward nacelle aft of the engine inlet of an aft nacelle and forward of a nozzle of the aft nacelle.

11. The method of claim 10, wherein the step of longitudinally offsetting the engine nacelles comprises:
    longitudinally aligning a location approximately midway between the engine inlet and the nozzle of the forward nacelle with the engine inlet of the aft nacelle.

12. The method of claim 9, wherein the step of longitudinally offsetting the engine nacelles comprises:
    overlapping a region of decreasing cross-sectional area of a forward nacelle with a region of increasing cross-sectional area of an aft nacelle.

13. The method of claim 9, wherein the step of longitudinally offsetting the engine nacelles comprises at least one of:
- adding a forward nacelle extension to an engine nacelle on one side of the body of an existing air vehicle; and
- adding an aft nacelle extension to an engine nacelle on an opposite side of the body of the existing air vehicle.

14. The method of claim 9, wherein the step of longitudinally offsetting the stabilizers comprises:
- longitudinally offsetting at least one of horizontal stabilizers and vertical stabilizers.

15. The method of claim 9, wherein the step of longitudinally offsetting the external stores comprises:
- mounting external stores in a bilaterally symmetrical manner on opposite sides of the body; and
- releasing an external store on one side of the body prior to releasing an external store on an opposite side of the body.

16. The method of claim 15 wherein at least one of the external stores comprises at least one of:
- a missile, a bomb, and a fuel pod.

17. The method of claim 9, wherein:
- the air vehicle comprises an airplane.

18. The method of claim 9, further including longitudinally offsetting at least one of the following components on opposite sides of the body:
- stabilizers;
- control surfaces.

* * * * *

UNITED STATES PATENT AND TRADEMARK OFFICE
CERTIFICATE OF CORRECTION

PATENT NO. : 8,979,018 B2  
APPLICATION NO. : 13/687483  
DATED : March 17, 2015  
INVENTOR(S) : William Pflug and Brian J. Tillotson Page 1 of 1

It is certified that error appears in the above-identified patent and that said Letters Patent is hereby corrected as shown below:

In the Claims

Column 15, Claim 1, Line 60: Please replace "aftwardly-swept fixed wines" with "aftwardly-swept fixed wings"

Column 16, Claim 8, Line 35: Please replace "fixed wines" with "fixed wings"

Column 16, Claim 9, Line 45: Please replace "fixed wines" with "fixed wings"

Signed and Sealed this
Twenty-third Day of June, 2015

Michelle K. Lee
*Director of the United States Patent and Trademark Office*